United States Patent [19]

Salant

[11] 4,330,306
[45] May 18, 1982

[54] GAS-LIQUID SEPARATOR
[75] Inventor: Richard F. Salant, Arlington Heights, Ill.
[73] Assignee: Centrilift-Hughes, Inc., Claremore, Okla.
[21] Appl. No.: 843,019
[22] Filed: Oct. 17, 1977

Related U.S. Application Data

[63] Continuation-in-part of Ser. No. 620,666, Oct. 8, 1975, abandoned.

[51] Int. Cl.³ .............................................. B01D 19/00
[52] U.S. Cl. ................... 55/159; 55/385 R; 55/472; 55/473; 55/522; 55/525; 166/105.5; 210/188; 417/313
[58] Field of Search ............ 55/159, 199, 201, 385 R, 55/467, 472, 473, 501, 521, 522, 525, DIG. 16; 166/105.5, 105.6; 210/188; 417/313

[56] References Cited

U.S. PATENT DOCUMENTS

| | | | |
|---|---|---|---|
| 1,158,989 | 11/1915 | DeBerry et al. | 55/500 X |
| 2,297,729 | 10/1942 | Thomas | 55/DIG. 16 X |
| 2,823,760 | 2/1958 | Andersen | 55/500 X |
| 3,003,580 | 10/1961 | Lanning | 210/188 X |
| 3,064,649 | 11/1962 | Fuson | 55/200 |
| 3,159,310 | 12/1964 | Rafferty | 222/63 |
| 3,273,313 | 9/1966 | Livesey et al. | 55/46 |
| 3,285,186 | 11/1966 | Tracy et al. | 55/467 X |
| 3,300,950 | 1/1967 | Carle | 55/199 |
| 3,492,793 | 2/1970 | Bhuta et al. | 55/159 |
| 3,523,408 | 8/1970 | Rosenberg | 55/159 |
| 3,624,822 | 11/1971 | Carle et al. | 417/313 |
| 3,631,654 | 1/1972 | Riely et al. | 55/159 |
| 3,747,302 | 7/1973 | Frayssinoux | 55/164 |
| 3,797,203 | 3/1974 | Murdock, Sr. | 55/201 X |
| 3,803,810 | 4/1974 | Rosenberg | 55/159 |

FOREIGN PATENT DOCUMENTS 54258  4/1943  Netherlands ........................ 55/36

OTHER PUBLICATIONS

Ward, A. S., "Filter Media Development and Innovation", in *Filtration and Separation*, Jan./Feb. 73. 10(1), pp. 61, 62, 64, 65, 73.

*Primary Examiner*—Kathleen J. Prunner
*Attorney, Agent, or Firm*—Robert A. Felsman

[57] ABSTRACT

A gas-liquid separator, especially for use with a submersible well pump, having a substantially conical-shaped mesh member in the path of flow of gas-laden liquid. The majority of the liquid flows through the mesh; gas bubbles are trapped by the mesh and are swept by the flow of the liquid to a location where they are removed with a relatively small amount of bleed liquid from the separator Any particulate foreign matter in the gas-laden liquid, is trapped by the mesh and is swept along with the gas bubbles to the gas removal location.

2 Claims, 7 Drawing Figures

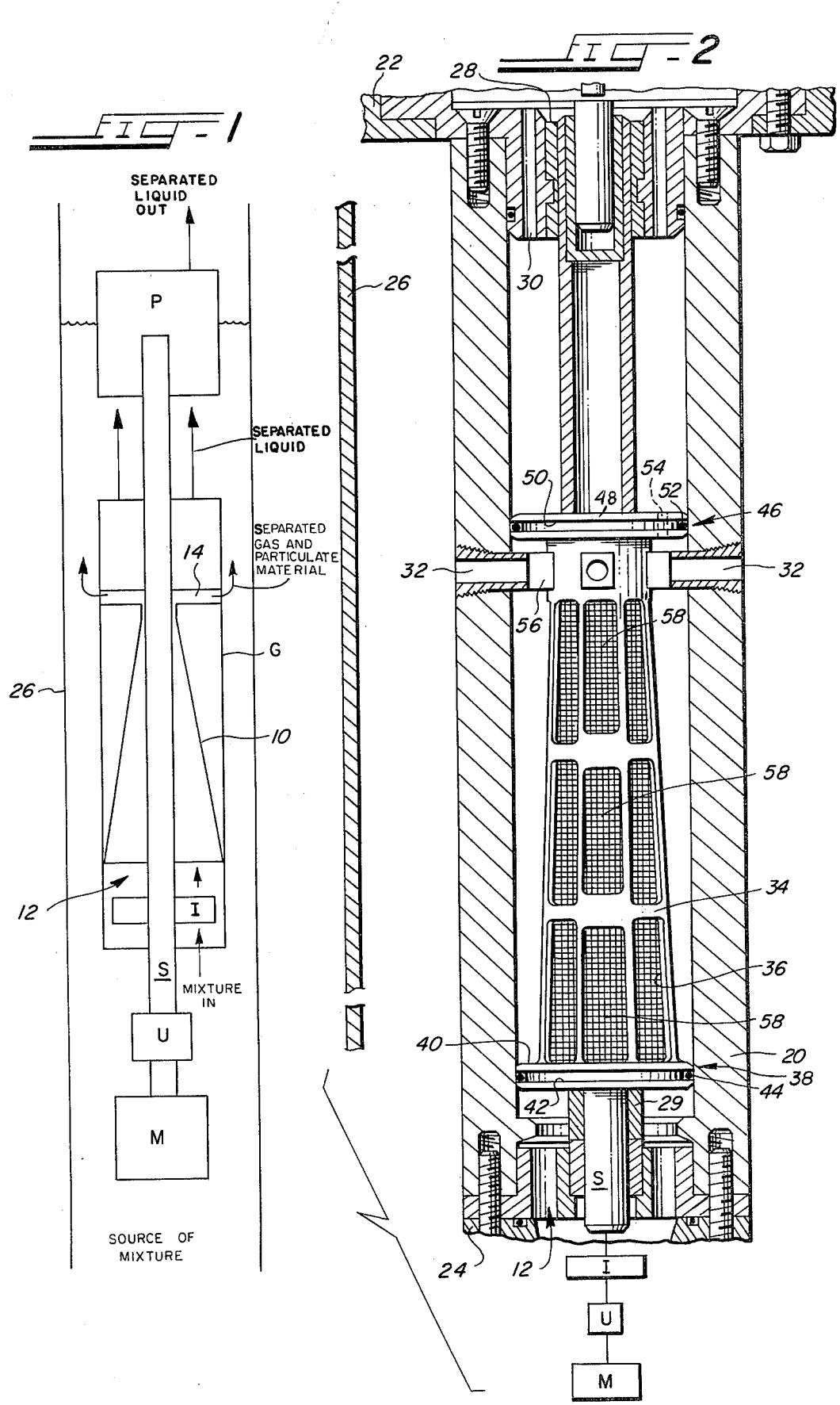

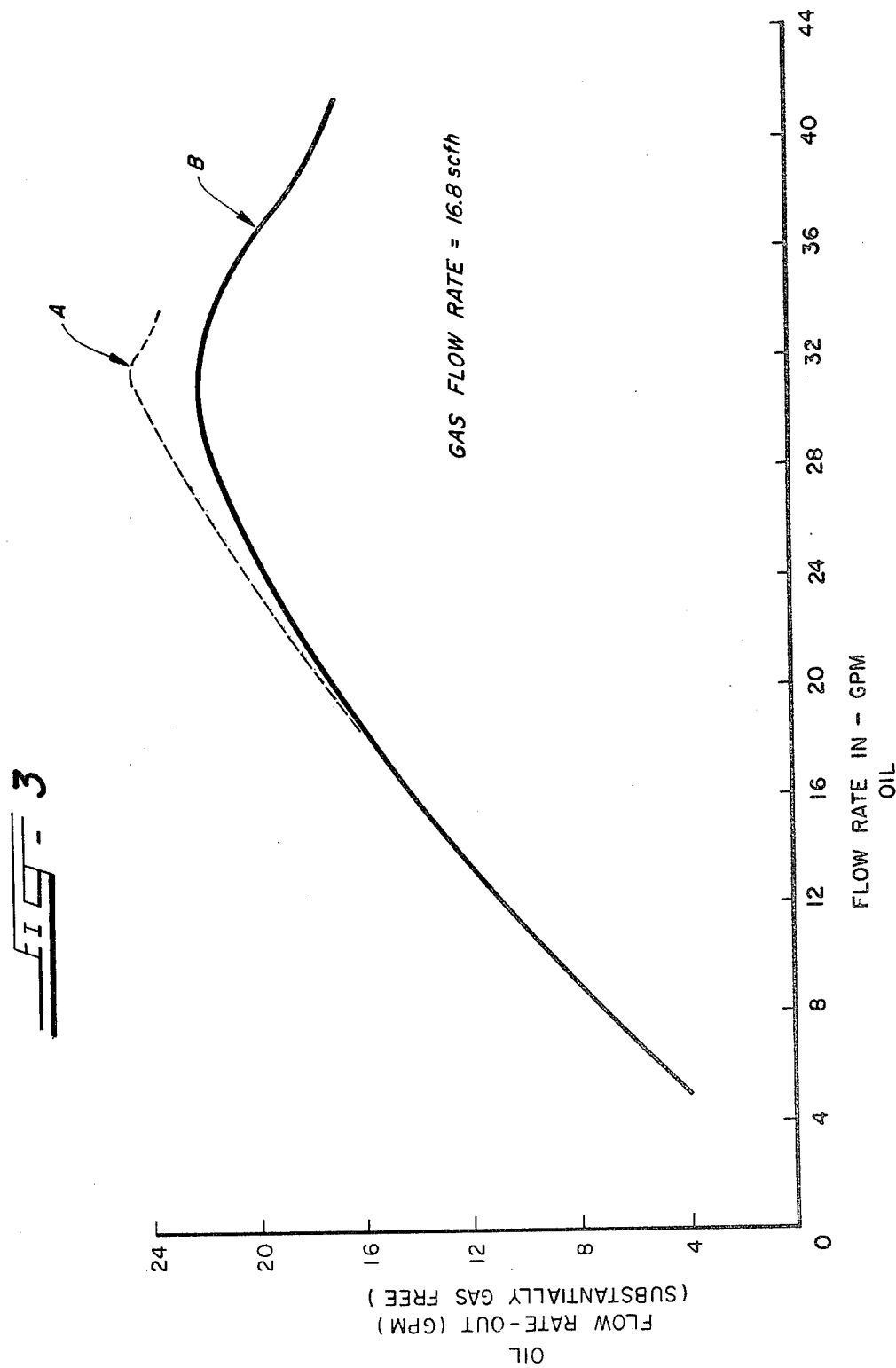

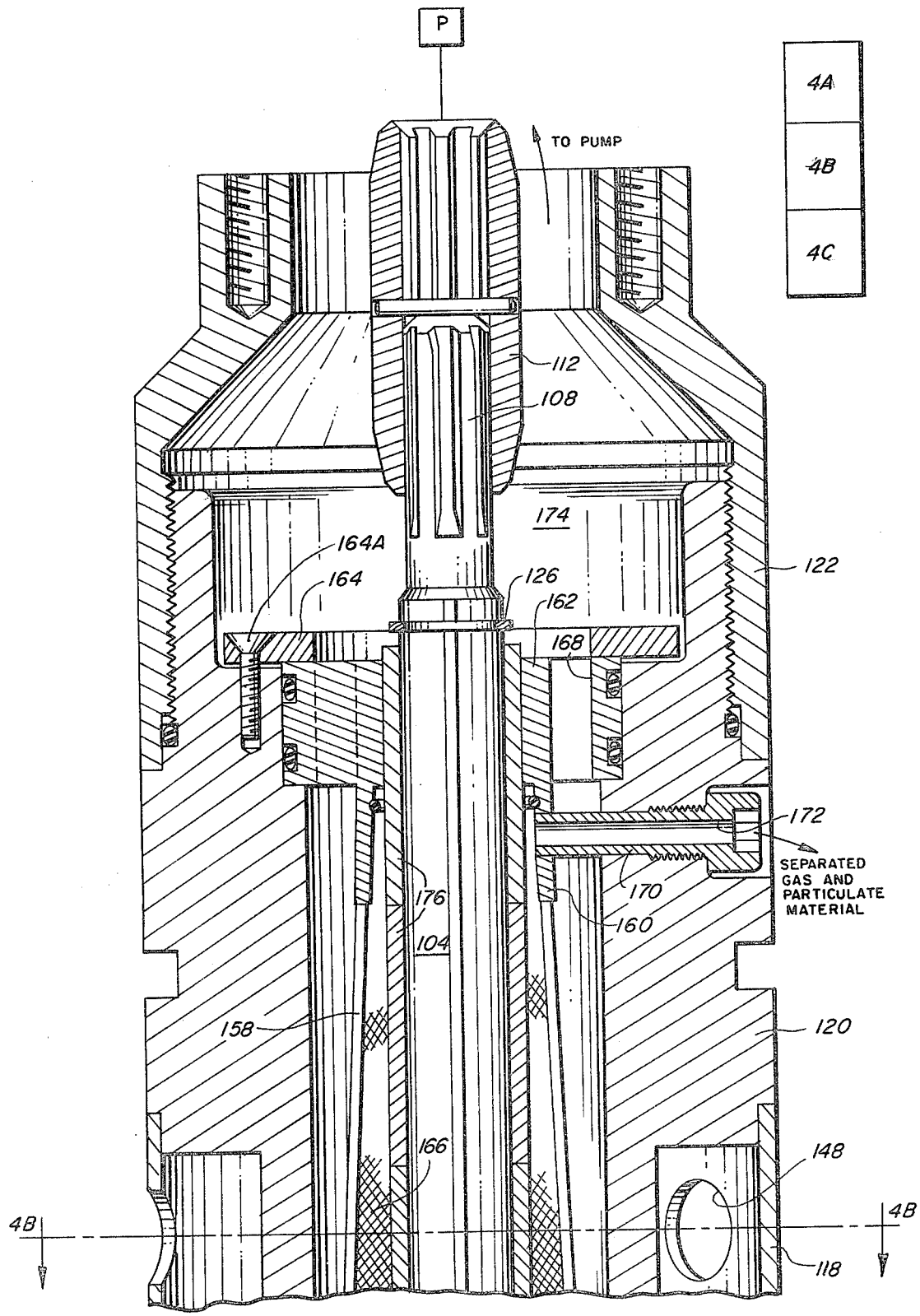

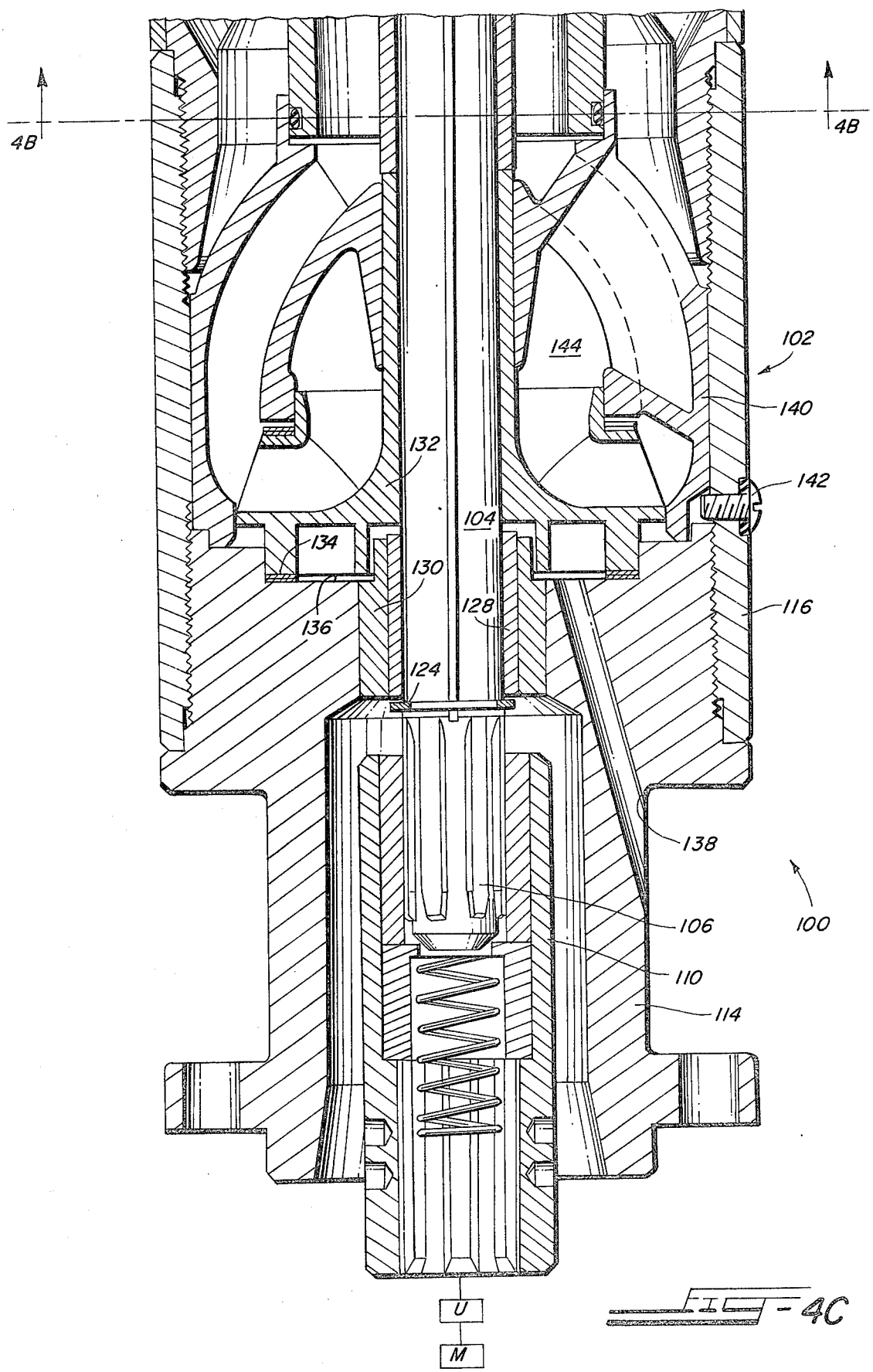

GAS-LIQUID SEPARATOR

CROSS-REFERENCE TO RELATED APPLICATION

This application is a continuation-in-part of my co-pending application, Ser. No. 620,666, filed Oct. 8, 1975 and entitled "Gas Separator" is now abandoned.

BACKGROUND OF THE INVENTION

The invention to be described herein relates especially to gas separators for use with submersible well pumps and especially to those which are used to pump oil from deep wells. About seventy-five percent of pumps sold annually in the United States for pumping oil from deep wells are equipped with some form of gas-oil separators, because pumps cannot effectively handle oil containing large quantities of gas. Many oil wells exist which have gas-oil ratios too high to economically produce oil at this time. In the Middle East, gas-oil ratios are high and, production rates are also high. To improve the production of gas-free oil, and to permit the economical production of oil from some wells in the United States, especially in these times when there is a serious energy crisis and where it is prudent to be self-supporting in the production of oil, the concept of using a separator to supply gas free oil to a pump in wells in which the gas-oil ratio is high becomes extremely important.

The prior art types of gas-oil separators are generally not entirely successful in providing a substantially gas-free product.

One of the problems encountered in submersible well pumps is that of geometry; i.e., the size of the device is restricted to the size parameters of such pumping devices, which may vary in diameter from about 4 inches to about 6¾ inches to be used in well casings which may vary from 4½ inches to 8–5⅝ inches in diameter. These pump assemblies may have a length, including the motor and usual seal section of approximately ten to thirty feet or more. The separator, to be functional, must be included within these parameters and within the diameter of the pump assembly.

Other types of gas separators are known in the art; usually they are not for use in down hole applications. They use porous members or filters placed in the flow stream which do not permit gas to pass; the gas is removed via a vent. All or parts of such filters may be wetted by the liquid. In order to prevent gas blockage of some filters, the filter element is constructed with both liquid wetted and liquid repellent parts. The liquid wetted parts will pass the liquid; the liquid-repellent parts will not be wetted by liquid and will remain open for the passage of gas.

THE INVENTION

According to this invention, an improved gas-liquid separator, particularly adaptable for use with deep well submersible pumps and adaptable for the parameters of such pumps, comprises a multi-pored member positioned in the path of a gas-liquid mixture flowing to the inlet of the pump, which member permits the passage of the liquid while, because of surface tension and pore size, does not permit the passage of gas bubbles and other non-liquid material. The invention is particularly adapted for use with pumps which handle gas-oil mixtures; reference to gas-oil mixtures and gas-liquid mixtures are intended to be generic to the problem of separating a gas from a liquid (whatever the liquid may be). The multi-pored member is preferably a mesh having a substantially conical shape which spans, at its basel end, the bore of a housing and, at its other end, is positioned in juxtaposition to the shaft joining the pump with a motor. Gas outlet means are associated with one end of the multi-pored member. In the preferred embodiment, the mesh is stainless steel and is supported by a frame constructed of a plurality of spaced rod members arranged to define a cone-like support. The mesh can also be a plastic, such as nylon and the support can be a frame member having a plurality of openings therethrough. It has also been found that efficiency of the device is improved when the gas-laden liquid flows into the basel end of the multi-pored member and the gas is removed at its opposite end which is adjacent to the inlet of a pump and to the shaft.

When observing a model of such a separator, it has been noted that there is a self-sweeping or cleaning action of the gas bubbles; i.e., they are swept along the surface of the multi-pored member together with a small amount of bleed liquid, upwardly along the mesh from the inlet to a gas discharge location. The discharge mixture has a relatively high gas-liquid ratio, much higher than the entering gas-liquid ratio. This action has an interesting effect on particles of foreign particulate material, such as sand. This material also migrates upwardly and is swept along the mesh member to be discharged with the gas bubbles; thus providing what may be referred to as self-cleaning screen or mesh. Thus, the mesh does not become clogged with such material which could result in a reduction in efficiency, frequent inspection, replacement or cleaning; therefore maintenance on the device is minimal.

THE DRAWINGS

FIG. 1 is a schematic illustration of a separator constructed according to this invention in the structural arrangement for use with submersible well pumps;

FIG. 2 is a longitudinal sectional view showing constructional details of an experimental separator of this invention in the same or similar arrangement illustrated in FIG. 1;

FIG. 3 illustrates performance curves of two cone arrangements;

FIG. 4 shows the manner of placing FIGS. 4A, 4B and 4C to illustrate a proposed commercial separator structure; and FIGS. 4A, 4B and 4C when assembled as in FIG. 4 is a cross-sectional view taken through a proposed commercial separator assembly constructed according to this invention.

DETAILED DESCRIPTION

Figure 4B:
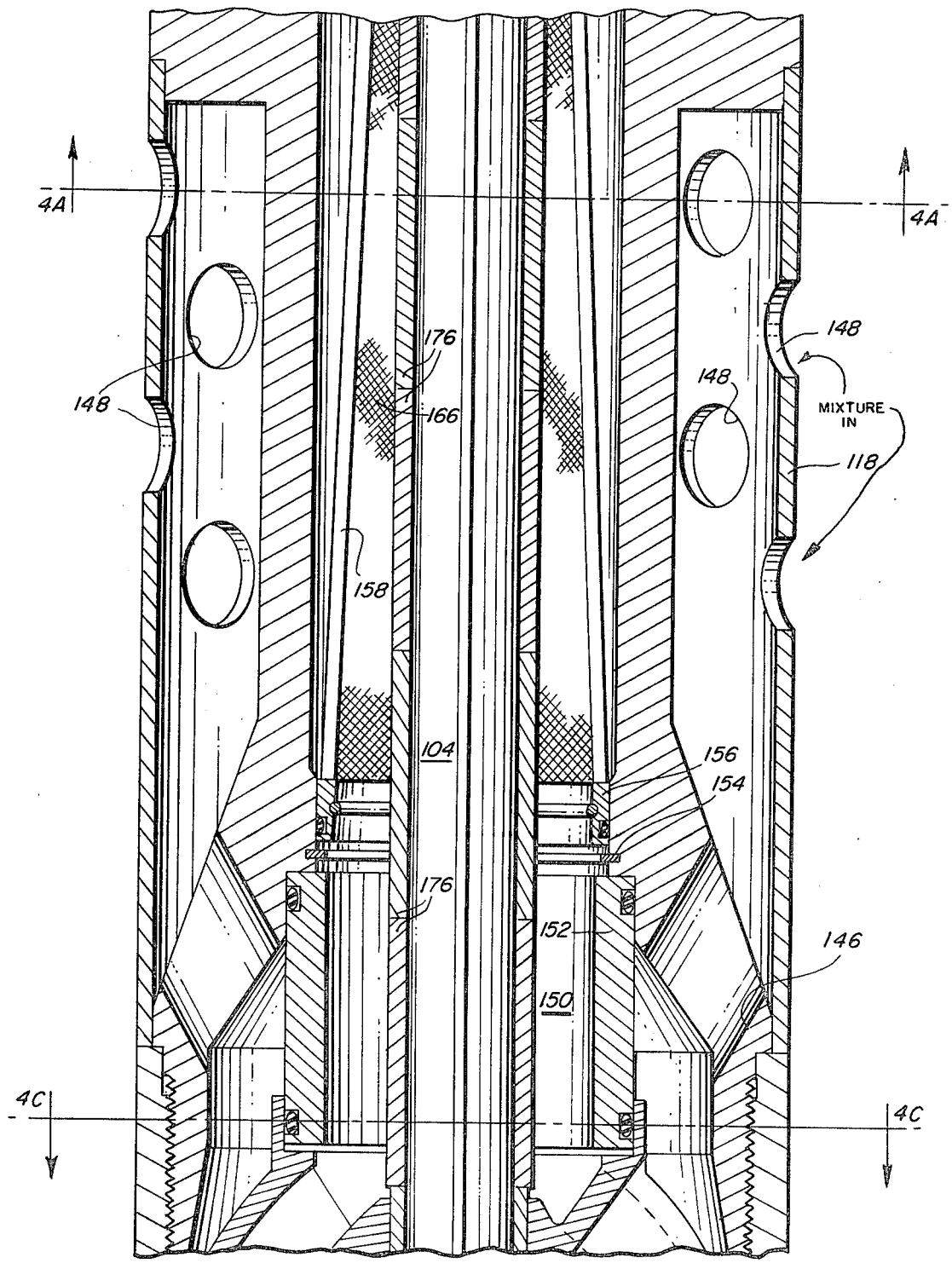

Referring now to FIG. 1 of the drawings, there is schematically illustrated, an arrangement which includes a separator G adapted to be positioned between a pump P and a prime mover or motor M, the latter having a driven shaft S which passes centrally through the separator G. A seal section U is located between the separator G and the motor M. These parts are in an elongated cylindrical housing which is adapted to be lowered into a well.

The separator G comprises a conical assembly 10, and in the preferred embodiment, comprises a multi-pored mesh and a conical support member. The basel end of the assembly is located adjacent a gas-liquid inlet 12. Substantially gas-free liquid phase through the mesh to the pump P. Bubbles of gas and other non-liquid material are trapped by the mesh and are swept upwardly toward the apex of the assembly by the flow of the liquid through the assembly and to outlets 14 near the apex. The passage of a gas-liquid mixture, i.e., bleed liquid and gas having a gas-to-liquid ratio much higher than the gas-to-liquid ratio entering the assembly is through the radial gas outlets 14. When more than one outlet 14 is provided, they are arranged in a spoke-like pattern. From the outlet 14, the gas-bleed liquid and particulate material mixture is discharged to the annular region between the separator housing and the well casing. Referring now to FIG. 2, the gas separator G comprises a housing 20 adapted to be connected between a pump housing 22 and a motor and a seal housing 24, so as to form an integral part of a submersible pump assembly for lowering in a well casing 26 (only a portion of which is shown). The composite housing 20, 22, 24 is of such diameter to be spaced from the well casing 26.

The pump P may be constructed according to U.S. Pat. No. 3,242,360 and is illustrated here only schematically. The seal section U may be constructed according to U.S. Pat. No. 3,153,160, and, like the pump, is illustrated here only schematically. In any case, the motor has a shaft S, extending through the seal section U, through the separator G and into the pump P and on which the pump impellers are mounted. Because of the length of the shaft S, it may be made in several parts suitably joined together. In the separator, the shaft S is supported by anti-friction journals 28, 29 at the opposite ends of the housing 20.

The housing 20 is provided, at one end, with the inlet passage or passages 12 for the flow of the raw mixture ultimately to the separator G and passage means comprising an outlet or outlets 30 for the flow of liquid, substantially gas-free, to the pump P. In addition, there are one or more outlets 32 from the housing 20 which open into the space between 20 and the casing 26 for the discharge of gas-rich liquid, i.e., gas and bleed liquid back into the casing from the separator G.

Within the separator housing 20, is a conical-shaped frame member 34 which supports the mesh. The frame 34 with a plurality of elongated openings 36 therethrough, as shown in FIG. 2, has its large entry or base end 38 adjacent to the inlet passages 12. This end is constructed with a cylindrical flange 40 having an outside diameter substantially equal to the inside diameter of the housing 20 and is formed with an annular groove 42 to receive an O-ring seal 44 in order to sealingly engage the interior of the housing 20, insuring the passage of all liquid-gas mixture from the inlet 12 into the interior of the support 34 and the conical mesh. In operation, there is a continuous flow of liquid-gas mixture into the member 10 and a continuous flow of liquid to the pump as well as a continuous flow of gas-bleed liquid to the casing.

The opposite or exit end 46 of the support 34 is also formed with a cylindrical flange 48 having an outside diameter also substantially the same as the inside diameter of the housing 20. This flange 48 is provided with an annular groove 50 to receive an O-ring seal 52 to sealingly engage the interior of the housing 20. The flange 48 is provided with a plurality of openings 54 as shown in broken lines. The end 46 of the member 34 has an inside diameter substantially the same as the diameter of the shaft S, permitting the shaft to rotate while the member 34 remains stationary. At the exit of the support 34, there are spoke-like conduits 56 which communicate the inside of the support 34 with the outlets 32 in the housing 20.

A multi-pored member comprising a mesh 58, for example of nylon, stainless steel or other suitable material, lines the interior of the support 34. Thus, the mesh is supported by the support 34. The mesh is such to permit the passage of liquid; bubbles of gas and also particulate foreign material if present, are trapped and do not pass the mesh. The flow of the liquid-gas mixture upwardly continually sweeps the gas bubbles and foreign particles to the outlet conduits 56, making the mesh self-cleaning. The gas bubbles and foreign particles are carried through the conduits 56 by a small amount of bleed liquid, as before stated.

To provide a continuous flow of gas-laden liquid to and through the separator, an impeller I may be used. This impeller may be constructed as is the impeller in the gas separator of the Carle U.S. Pat. No. 3,300,950, which is primarily to eliminate gas lock of the pump. Other types of impellers can be used if desired.

The support 34 may be constructed of stainless steel or a relatively cheap plastic, or other material, so long as the material will not distort or disintegrate in the environment. The mesh material 58, as stated before, can be of stainless steel, nylon or other suitable material. The mesh material may be of different mesh size at different locations relative to the cone without departing from the scope of this invention. Also, while the support has been described as having its basel end near the inlet for the gas-liquid mixture, it may be inverted. In this arrangement the gas outlet is in juxtaposition to the large (upper) end of the support. The length of the support and thus the mesh may also vary.

However, in experimental tests, it has been found that improved results occurred when the support was used as described and illustrated in the drawings.

FIG. 3, is a curve for experimental work showing the output of substantially gas-free oil in gallons per minute plotted against the input of a No. 1 fuel oil in gallons per minute to which has been added 16.8 standard cubic feet per hour of air (scfh). The apparatus used was essentially that illustrated in FIG. 2. In this experimental work, one cone support was 9 inches in length; another was 5-13/16 inches in length; the mesh was a 310×310 nylon mesh in each case, and the inner diameter of the housing was approximately 2.3 inches. The curve for the 9 inch support is identified as A; that for the 5-13/16 inch support is identified as B. The arrangement of supports was substantially as described in the description of the preferred embodiment and as illustrated in the drawing. The open areas of the cones A and B were, respectively, approximately 76% and 84% of the total surface area of the cones, the open area of course being covered by the mesh. The experiments were performed at ambient temperature, approximately 70° F. As can be deduced from the curves, the flow rate of gas-free oil varies with input feed rate; it reaches an upper level and then drops off as the input feed rate increases.

Further experiments were performed in which approximately ½ to 1% of sand, based on the volume of input oil, was bled into the system; other variables were substantially the same as described above. It was observed that the product was substantially gas and sand free. Sand particles were observed being swept to the gas outlet.

Additional experiments have been conducted using high viscosity oils—higher than the No. 1 grade fuel oil.

Small gas bubbles were observed in the oil output, but with conventional laboratory equipment, the quantity of the gas bubbles was too small to be measured.

The experiments above were conducted with a 310 nylon mesh; practical mesh sizes (strands per inch) of about 50 to about 400 can be used. It has been observed that using larger mesh sizes (smaller openings) the performance at low levels is substantially the same as described.

Attention is now invited to FIGS. 4, 4A, 4B and 4C which show a proposed commercial gas separator assembly 100 adapted to be connected between a motor M and a seal section U and a pump P and which comprises a multiple part housing, generally indicated at 102, through which extends a shaft 104 having splined ends 106, 108 connected to internally splined couplings 110, 112, respectively. The couplings 110, 112 are adapted to receive shafts from the motor M and pump, respectively. The housing 102 comprises a base subassembly 114, a base housing 116, a gas separator housing 118, a crossover guide 120 and an adaptor head 122, assembled and connected together as illustrated. The shaft 104 is located in the assembly 100 by means of lower and upper snap rings 124 and 126, respectively, which are received in appropriate grooves formed in the shaft.

The shaft 104 is rotatably supported at the bottom of the assembly 100 in the base subassembly 114 by means of a spacer sleeve 128 surrounded by a bushing 130. A mixed flow impeller 132 is keyed to the shaft 104, so as to rotate therewith and is supported on one or more thrust washers 134 supported in a cavity 136 in the base subassembly 114. Passage of oil or well fluid to and from the cavity 136 is by way of one or more passageways 138 in the base subassembly 114.

A stationary mixed flow or crossover diffuser 140 surrounds a cylindrical portion of the impeller and is fixed against rotation with the shaft 104 by means of one or more retaining screws 142.

Fluid is introduced into the inlet 144 of the impeller 132 by way of passageways 146 in the cross-over guide 120 and thereto through openings 148 in the separator housing 118. Fluid from the diffuser 140 discharges into a cavity 150 defined by a spacer tube 152 which is located between the diffuser 140 and the lower part of the cross-over guide 120.

Supported above a snap ring 154 in a suitable groove in the cross-over guide 120 is a ring member 156 which supports a plurality of rods 158, the upper ends of which are supported by a depending conical apron 160 of a cylindrical member 162. A ring member 164 which maintains the member 162 in position is bolted to the cross-over guide 120 by bolts 164A. The rods 158 are so disposed to define a cone and support a mesh member 166, preferably a stainless steel mesh of a mesh size on the order of 325 (strands per inch).

Passageways 168 are provided in the member 162 and vent members 170, threadably received in the cross-over guide 120, provide passageways 172 (generally at least four) from the interior of the apron 160 to the outside of the assembly 100. The passageways 168 exit to the interior cavity 174 of the adaptor head which is to be connected to the inlet of the pump P.

A series of spacer sleeves 176 surround the shaft 104 between the impeller 132 and the snap ring 126. Suitable O-ring seals are provided where necessary.

As will be noted, the interior of the ring member 156 communicates with the interior of the mesh cone 166; also, the passageways 172 communicate with the interior of the cone 166. The passageways 168 communicate with the exterior of the cone 166.

The assembly 100 is adapted to be located in the casing of a well, such that fluid in the casing will flow into the passages 148 and to the impeller 132 to be impelled upwardly into the cone 166. The separation of gases in the fluid is the same as that described. Gas plus bleed oil is discharged through the passages 172 into the casing (not shown) while gas-free oil passes through passageways 168 to the inlet of the pump P.

While the gas separator described herein finds particular use in separating gas from a gas-laden liquid, it can also be used to separate particulate matter from a particulate matter-laden liquid. The sweeping action described with respect to gases is substantially the same as respect to particulate matter.

I claim:

1. A separator assembly for separating gas and any particulate material from a flowable mixture of liquid, gas and any particulate material which assembly is adapted to be associated with a motor and a pump having a pump inlet and being driven by said motor for pumping the liquid therefrom comprising:

a housing having a pair of spaced ends;

an inlet to one end of said housing communicating with a source of said flowable mixture;

an outlet from the other end of said housing adapted to be in communication with said pump inlet for the passage of liquid from the separator assembly to said pump;

outlet means for the flow of separated gas and any particulate material from said housing together with a small amount of bleed liquid;

a stationary generally conical-shaped multipored member in said housing having its basel end spanning the housing and maintained in sealed relation with respect to the interior walls thereof and its other end generally centrally located in said housing;

one end of said multi-pored member being an entry end for said flowable mixture and the other end being an exit end;

said outlet means being connected to said exit end of said multipored member;

said multi-pored member being so disposed in said housing to intersect the flow of all mixture which flows into and through said inlet and to said entry end having pores of such dimensions to permit the passage therethrough of said liquid while trapping gas in the form of bubbles and any particulate material, said trapped bubbles of gas and any particulate material being moved and swept along said multipored member in the general direction of continuous mixture flow and to said exit end and through said outlet means.

2. A separator assembly for separating gas from a flowable mixture of oil and gas and which assembly is adapted to be positioned in a well and between a submersible motor and a pump having a pump inlet and being driven by said motor with a motor shaft passing centrally through said separator assembly, said pump pumping the oil therefrom comprising;

a housing having a pair of spaced ends;

an inlet to one end of said housing communicating with a source of said flowable mixture;

an outlet from the other end of said housing adapted to be in communication with said pump inlet for the passage of oil from the separator assembly to said pump;

outlet means for the flow of separated gas from said housing together with a small quantity of bleed oil;

a stationary generally conical-shaped mesh member in said housing having its basel end spanning the housing and maintained in sealed relation with respect to the interior walls thereof and its other end generally centrally located in said housing;

said basel end being an entry end and said outer end being an exit end;

said outlet means being connected to said exit end of said mesh member;

impeller means positioned below said housing, said impeller means providing a continuous flow of said flowable mixture into said housing through said inlet and into the basel end of said mesh member and the continuous flow of separated oil and separated gas and bleed oil to said outlet and said outlet means;

said mesh member being so disposed in said housing to intersect the flow of all mixture which flows into and through said inlet to the basel end thereof and having a mesh size to permit the passage therethrough of said oil while trapping gas in the form of bubbles of gas, said trapped gas being moved and swept along the mesh member inwardly to said exit end and through said outlet means by the continuous flow of mixture to and through said assembly.

* * * * *

UNITED STATES PATENT OFFICE
CERTIFICATE OF CORRECTION

Patent No. 4,330,306　　　　　Dated May 18, 1982

Inventor(s) Richard F. Salant

It is certified that error appears in the above-identified patent and that said Letters Patent are hereby corrected as shown below:

At column 6, line 49, --and-- should be inserted after "end";
At column 7, line 10, "outer" should be --other--.

Signed and Sealed this

Seventeenth Day of August 1982

[SEAL]

Attest:

GERALD J. MOSSINGHOFF

Attesting Officer　　　Commissioner of Patents and Trademarks